No. 833,819. PATENTED OCT. 23, 1906.
F. H. ALLEN.
APPARATUS FOR UNLOADING AND FEEDING CANE.
APPLICATION FILED MAY 14, 1906.
2 SHEETS—SHEET 1.
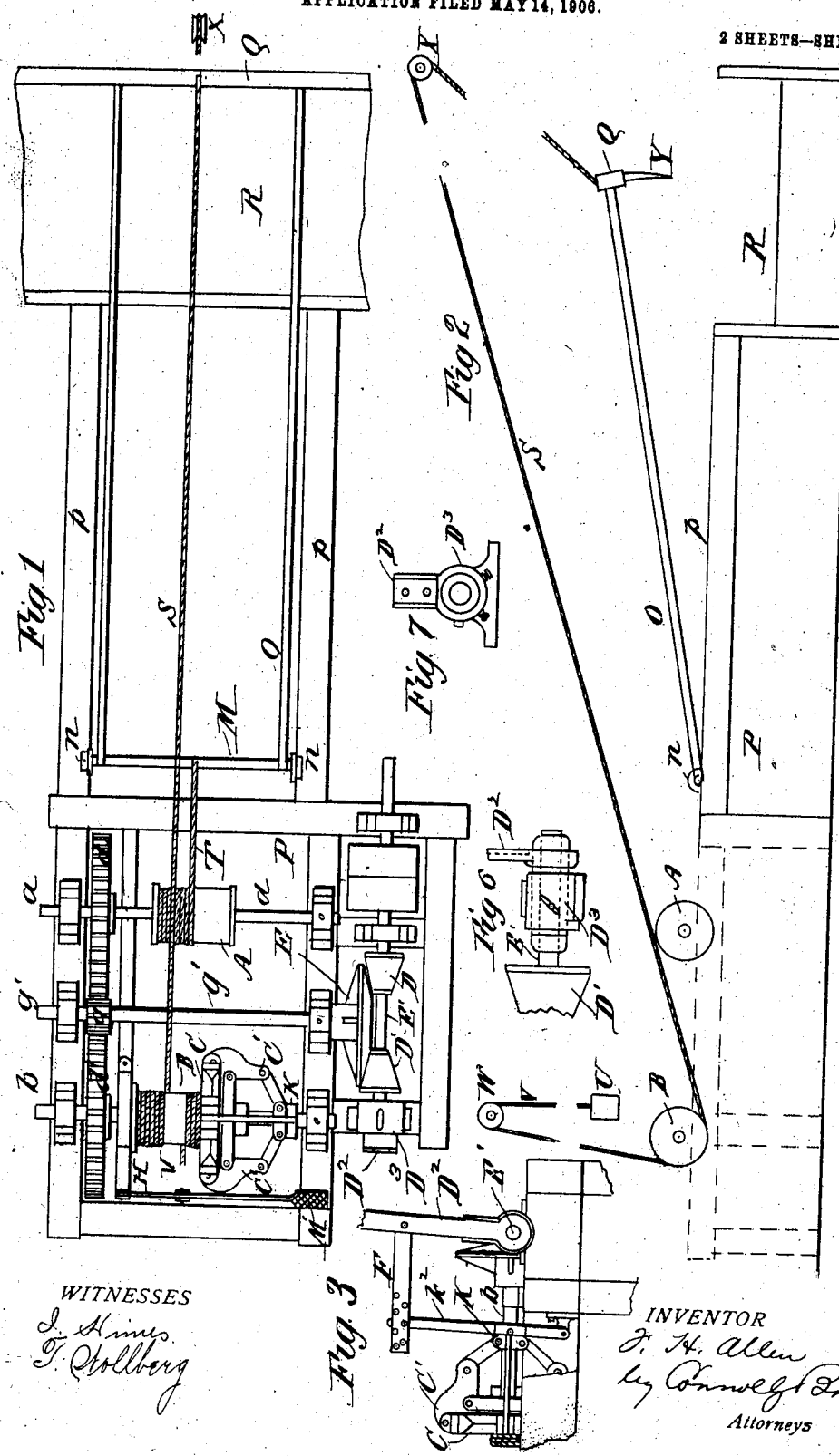
WITNESSES
INVENTOR
Attorneys No. 833,819. PATENTED OCT. 23, 1906.
F. H. ALLEN.
APPARATUS FOR UNLOADING AND FEEDING CANE.
APPLICATION FILED MAY 14, 1906.
2 SHEETS—SHEET 2.
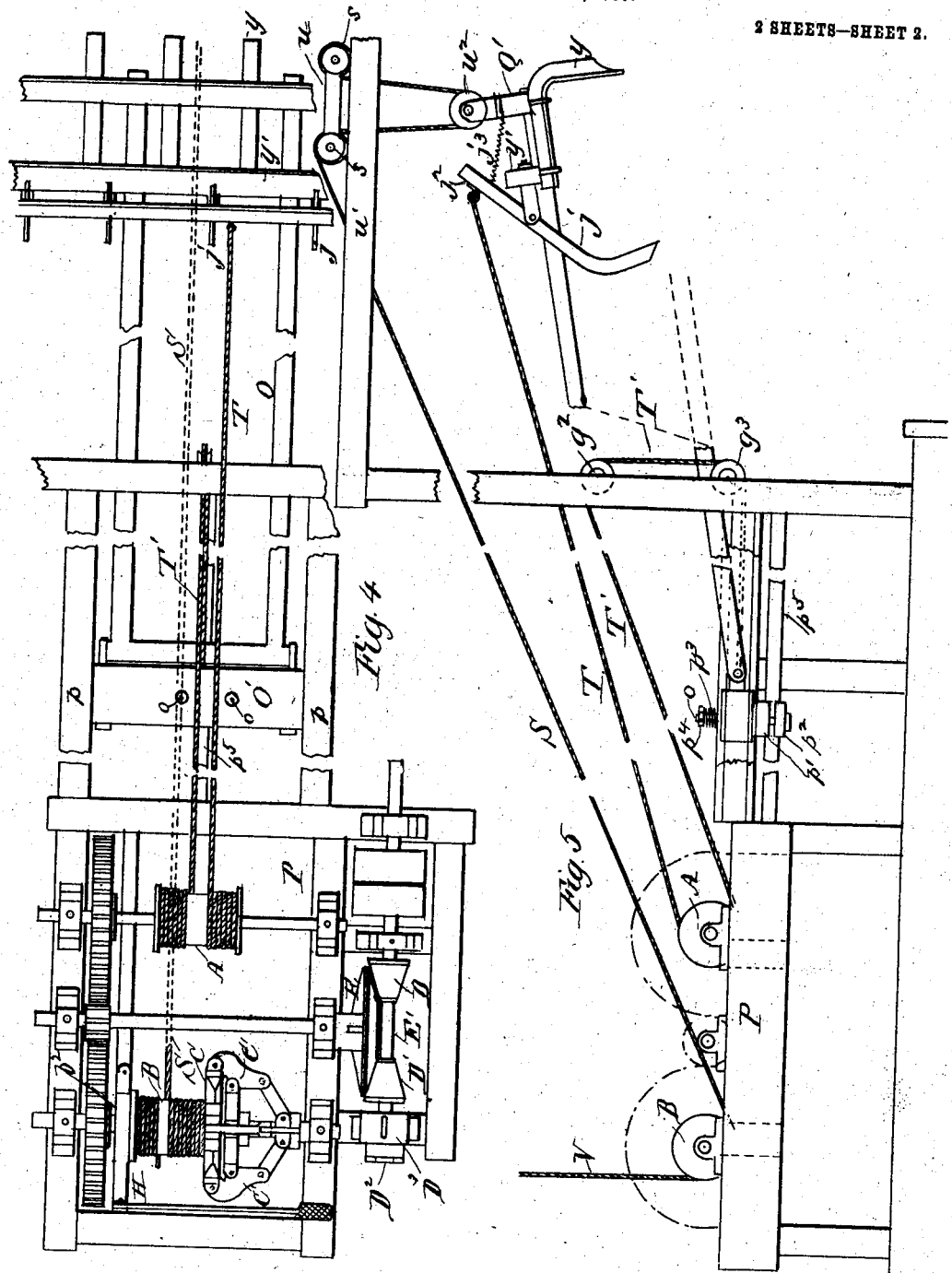

UNITED STATES PATENT OFFICE.

FRANK H. ALLEN, OF DONALDSONVILLE, LOUISIANA.

APPARATUS FOR UNLOADING AND FEEDING CANE.

No. 833,819.      Specification of Letters Patent.      Patented Oct. 23, 1906.

Application filed May 14, 1906. Serial No. 316,786.

*To all whom it may concern:*

Be it known that I, FRANK H. ALLEN, a citizen of the United States, residing at Donaldsonville, in the county of Ascension and State of Louisiana, have invented certain new and useful Improvements in Apparatus for Unloading and Feeding Cane, of which the following is a specification.

My invention has relation to machines for automatically unloading and feeding sugar-cane or similar material from cars to and upon a suitable carrier by which it is continuously transported to the mill or to any other desired point.

The object of my invention is to provide an apparatus by which the operations of the rake in raising, lowering, and moving forward and backward to engage or grasp the cane on the car, rake off and deposit on the carrier sufficient quantities at a time, and rise from the deposited load and again reach forward to grab another load may be effectively and continuously performed by comparatively simple and inexpensive appliance wholly under the control of a single operator or attendant.

My invention consists in the novel construction, combination, and arrangement of devices hereinafter described and claimed, reference being had to the accompanying drawings, in which—

Figure 1 is a plan view of the apparatus embodying my invention. Fig. 2 is a side elevation, and Fig. 3 an end elevation of the same. Figs. 4 and 5 are respectively a plan view and side elevation of modified form of unloading apparatus. Figs. 6 and 7 are detail views.

In the drawings, Figs. 1, 2, and 3, R designates an endless carrier of any suitable type which is designed to feed with sugar-cane or other material from cars running on a track alongside of the carrier, the cars being either open on the side nearest the carrier or made with a side which may be lowered to be unloaded. P designates the frame of the unloading and feeding apparatus, comprising horizontal ways $p$ $p$, on which run wheels $n$ $n$, mounted on an axle M of the grab-frame O, the forward end of which carries the cross-tree Q, bearing the hooks Y. A rope S is connected to the cross-tree Q of the grab-frame O and extends upward and over a pulley X, journaled on a stationary support, and is thence run back to a drum B, loosely mounted on a transverse shaft $b$, journaled on the frame P near its rear end. The rope runs under and thence around the drum B. V is a rope attached to the drum B on the opposite side from the rope S and thence continued upward and over a stationary sheave W, and said rope V supports a counterweight U. Another rope T, to draw the grab-frame backward, is attached to the axle M and runs back and in a reverse direction to the windings on drum B, around a drum A, keyed to a shaft $a$, mounted in bearings on the frame P in advance of the drum B. The rotation alternately in opposite directions of the drums B and A produces the proper movements of the grab-frame forward and upward and then downward and backward. The shafts $a$ and $b$ carry each a large gear-wheel $d$ and $d'$, respectively, in mesh with an intermediate pinion $g$, mounted on a shaft $g'$ and carrying at one end a beveled wheel E, with which friction-cones D D', mounted on a shaft E', are adapted to engage alternately to turn the wheel E' in either direction, according to whichever of the friction-cones is brought to bear against it. The shaft E' is run from any suitable power and the friction-cones D D' are operated by means of a lever $D^2$ and end-thrust box $D^3$. The drum B has on one end a grooved clutch-wheel or end C, with which clutch-levers C' C' are adapted to engage, and these levers are pivotally connected to a slip-collar K, splined on the shaft $b$ of drum B and connected, as shown, to a clutch-lever bar $k^2$, coupled by a connecting-rod $f$ to a lever $D^2$, fulcrumed on the frame of the apparatus. By pushing the lever $D^2$ toward the clutch-wheel C the ends of clutch-arms or levers C' C' are tightened upon the clutch-wheel, so as to cause the drum to rotate with the shaft $b$ and wind up the rope S, thereby pulling out the grab-frame and at the same time raising it to the top of the load of cane. By pulling the lever $D^2$ away from the clutch-wheel the grip on the clutch-wheel is loosened and the latter allowed to run free on its shaft. At the same time by means of the lever $D^2$ the friction-cones D D' are shifted so as to reverse the motion of the shafts $g'$ $b$ $a$. This causes the drum A to wind up the rope T and pull the grab toward the carrier R with its load of cane, and as often and as fast as this reversal takes place the operation is repeated. The rope V, winding on the drum B in the opposite direction from the rope S and having the weight U on the end, revolves the drum B when the clutch-jaws are released, thus taking up the slack in the rope S, making it and the rope T, with their connection O, an endless rope, so that the instant the lever is reversed the grab starts in the desired direction. The friction-clutch C, rope V, and weight U are important features, as the rope S has not only to pull out the grab, but must be long enough to slack away and allow the grab to drop on the cane, and if it were not for the counterweight U there would always be several feet of slack in the rope S and the grab would not reverse the instant the machine was reversed, but would have to take in the slack before it would begin to move. H designates a friction-brake engaging with the hub extension $b^2$ of the drum B. This brake is connected to a foot-lever M, and the operator by placing his foot on this lever can control the descent of the grab upon the load of cane as heavily or lightly as he pleases and can cause it to pull on half a load or any smaller quantity of cane.

In the modification shown in Figs. 4 and 5 the grab-frame O is hinged to a cross-head O', through which passes vertically two headed and screw-threaded bolts $o$ $o$, which support below the cross-head two clamping-blocks $p'$ $p^2$, of hard wood, which are recessed on their opposing surfaces for the passage of a pipe $p^5$, running lengthwise of the frame P and secured to its end timbers. Above the cross-head O' springs $p^3$ $p^3$ surround the bolts $o$ $o$, and the latter carry nuts $p^4$ $p^4$, by which the springs are compressed. The blocks $p'$ $p^2$ clamp the pipe $p^5$ and provide frictional resistance to the movement of the grab-frame. The rope T, passing over and around the drum A, is connected at its forward end to the grab, and another rope T', passing under and around the drum A in the opposite direction, extends forward and over pulley $g^2$, thence under pulley $g^3$, both attached to uprights of the frame of the apparatus, and is then run back and attached to the cross-head O'. The rope S from the drum B, running forward and upward, passes over one of the pulleys $s$ of a trolley $u$, traveling on the horizontal ways $u'$ of the frame of the apparatus, and is thence carried down and under a pulley $u^2$, attached to the grab, and then upward over the other pulley $s$ of the trolley, and its end permanently attached to a stationary part of the frame. The grab or grab-head consists of a transverse bar Q', to which are secured the arms $y$, and to a cross-bar $y'$, connecting these arms, are pivotally attached the grab-hooks $j$, connected together by a piece of angle-iron $j^2$. A spring $j^3$ is attached to the upper extensions of one or more of the grab-hooks and the grab-head Q' and tends to keep the hooks open.

The operations of the devices used in the modification above described are as follows: The ropes T and T' wind around the drum A, T from the top of the drum and T' from the bottom, so that when one winds in the other winds out, and being attached to the grab cause it to move in and out. The grab-arms $j$ are hinged on the piece $y'$, so that when one moves they all move. The rope T being attached to the upper end of hooks $j$, whenever strain is placed on the rope T, required to pull in the grab, it causes the lower end of the grab-hooks to travel toward the rigid arms $y$ and grab the cane between them and hold the cane till the strain is reversed from the rope T and placed on the rope T'. Then the slack in the rope T will permit the spring $j^3$ to pull the grab open and release the cane. The ropes S and V both wind around the drum B in opposite directions. S on leaving the drum passes, as before stated, over one sheave on the trolley $u$, then down and through the sheave $u^2$, and up again and over the other sheave of the trolley, thence to the frame A', to which it is made fast. The rope T winds around the drum A in opposite direction to the rope S. When the operator pulls the lever $D^2$ in the direction of the drum B, it brings one of the cones D D' in contact with the wheel E, causing the drum A to wind in the rope T and pull the grab toward the car of cane, and at the same time it causes the friction-clutch to grip the drum B and wind in the rope S, raising the grab to the top of the load of cane in the car. Upon reversing the lever $D^2$ the drums revolve in the opposite direction, releasing the drum B, allowing the grab-rake to drop out the cane and tightening the rope T, causing the grabs to close on the cane and pulling it in the direction of the carrier. At the same time the weight U rewinds the rope S on the drum B, so that it is always ready to perform its function of raising the grab for another operation. The pipe $p^5$ runs beneath the slides $p$ $p$ and cross-head O'. The pieces of hard wood $p'$ $p^2$ are clamped onto the pipe $p^5$ by the two bolts $o$ and slide back and forth along this pipe, causing more or less friction, according to how tight the springs $p^3$ are screwed down. The object of this is to prevent the grab from coming in too easily, thereby putting a greater strain on the rope T and causing the hinged arms or hooks $j$ to grip the cane harder, so that it will not fall out of the grab until it is released by reversing the lever $D^2$ and changing the direction of the drums.

Having described my invention, I claim as new and desire to secure by Letters Patent—

1. In a cane unloading and feeding apparatus, the combination with the grab-frame arranged and adapted to move outwardly and upwardly and then downwardly and rearwardly, of the ropes S, T, drums B, A, upon which said ropes are respectively wound, means for rotating the drums alternately in opposite directions, means for reversing the direction of movement of the drum-operating mechanism, means for disconnecting the drum B from its shaft, and means for taking up the slack of the rope S when the grab is to be moved outward and upward.

2. In a cane unloading and feeding apparatus, the combination with the grab-frame, of the ropes S, T, separate drums on which said ropes are wound, means for alternately rotating said drums in opposite directions and a clutch for connecting the drum B to and disconnecting it from its propelling-shaft.

3. In a cane-unloading machine the combination with the grab-frame, the ropes S T and drums A B, of the shaft $g$, means for rotating the drums from said shaft, beveled wheel E mounted on shaft $g$, friction-cones D D' and means for bringing either of said cones to bear on said wheel to control the direction of its rotation and through it the direction of rotation of the drums.

4. In a cane loading and feeding apparatus, the combination with the drum B, rope S and grab-frame O, of a brake to control the movements of said drum, and a foot-lever connected with said brake.

5. In a cane unloading and feeding apparatus, the combination with the grab-frame, rope S, drum B adapted to be connected to and disconnected from its shaft, of the rope V, sheave W and counterweight U, arranged and adapted to take up the slack of the rope S, when the operation of the machine is reversed, after delivering a load to the carrier.

6. In a cane unloading and feeding apparatus, the combination with the ropes or cables S, T, drums A, B, and means for rotating said drums alternately, in opposite directions, of a grab-frame, jaws attached thereto one series of which is movable with relation to the other, and means for automatically opening and closing said jaws.

7. In a cane unloading and feeding apparatus, the combination with suitable ropes, or cables, and drums upon which the same are wound of a grab-frame to which said ropes or cables are attached, jaws mounted on the end of said frame, a sliding cross-head to which the grab-frame is hinged adjustable clamping-blocks attached to the cross-head, and a pipe or rod with which said blocks engage.

8. In a cane unloading and feeding apparatus, the combination with a horizontally-traveling, and hinged grab-frame, of grab-jaws mounted thereon, and adapted to be opened and closed, ropes or cables attached, one to the grab-frame, and to the movable jaws of the grab and the other to the grab-frame and to a stationary part of the unloading apparatus, said ropes or cables being carried around suitable pulleys and wound on separate drums, and means whereby said drums may be alternately rotated in opposite directions, substantially as described.

In testimony whereof I have signed my name to this specification in the presence of two subscribing witnesses.

FRANK H. ALLEN.

Witnesses:
R. N. SLATOR,
O. FONTANA.